US009628198B2

(12) United States Patent
Lee (10) Patent No.: US 9,628,198 B2
(45) Date of Patent: Apr. 18, 2017

(54) APPARATUS AND METHOD FOR CANCELING MULTI-USER INTERFERENCE IN WIRELESS COMMUNICATION SYSTEM (71) Applicant: Samsung Electronics Co., Ltd., Gyeonggi-do (KR)

(72) Inventor: Ik-Beom Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 133 days.

(21) Appl. No.: 14/586,316

(22) Filed: Dec. 30, 2014

(65) Prior Publication Data
US 2015/0188645 A1   Jul. 2, 2015

(30) Foreign Application Priority Data

Dec. 30, 2013  (KR) .................. 10-2013-0166753

(51) Int. Cl.
| H04B 15/00 | (2006.01) |
| H04W 72/08 | (2009.01) |
| H04W 24/08 | (2009.01) |
| H04J 11/00 | (2006.01) |
| H04L 25/02 | (2006.01) |

(52) U.S. Cl.
CPC ............ *H04B 15/00* (2013.01); *H04J 11/003* (2013.01); *H04L 25/0202* (2013.01); *H04W 24/08* (2013.01); *H04W 72/085* (2013.01)

(58) Field of Classification Search
None
See application file for complete search history.

(56) References Cited

U.S. PATENT DOCUMENTS

| 2009/0103648 A1* | 4/2009 | Fukuoka ............... H04L 5/0044 375/267 |
| 2009/0116568 A1* | 5/2009 | Lindoff ................. H04B 7/086 375/260 |
| 2012/0014465 A1 | 1/2012 | Zhang et al. |
| 2012/0140725 A1* | 6/2012 | Kawamura ........... H04L 5/0048 370/329 |
| 2012/0182857 A1* | 7/2012 | Bertrand ............. H04J 13/0062 370/210 |

(Continued)

FOREIGN PATENT DOCUMENTS

EP     2 573 944     3/2013

OTHER PUBLICATIONS

Pierre Bertrand et al., "Chapter 19: Random Access", Internet Citation, XP-002665633, Feb. 17, 2009.

(Continued)

*Primary Examiner* — Christopher Crutchfield
*Assistant Examiner* — Tito Pham
(74) *Attorney, Agent, or Firm* — The Farrell Law Firm, P.C.

(57) ABSTRACT

Disclosed is a method for canceling multi-user interference (MUI) by a base station (BS) in a wireless communication system. The method includes determining the number of tones to accumulate channel values among tones included in a resource area, based on a minimum delta cyclic shift (CS) that represents a minimum gap between CS values allocated to user equipments (UEs) and a number of UEs to be multiplexed, creating a matrix of amounts of change in phase for the tones to accumulate for the UEs to be multiplexed, and canceling MUI based on a signal matrix.

20 Claims, 6 Drawing Sheets (56) References Cited

U.S. PATENT DOCUMENTS

| | | | |
|---|---|---|---|
| 2013/0022091 A1* | 1/2013 | Muralidhar | H04L 25/022 |
| | | | 375/219 |
| 2013/0124462 A1* | 5/2013 | Bryan | G06F 17/30743 |
| | | | 707/610 |
| 2013/0188503 A1* | 7/2013 | Anepu | H04W 24/10 |
| | | | 370/252 |
| 2014/0307699 A1* | 10/2014 | Sorrentino | H04L 5/0007 |
| | | | 370/329 |

OTHER PUBLICATIONS

Nokia Siemens Networks, Nokia, "Flexible RACH Signature Number", R1-072966, 3GPP TSG RAN WG1 Meeting #49bis, Jun. 25-29, 2007.
European Search Report dated Apr. 28, 2015 issued in counterpart application No. 14200472.0-1852.

* cited by examiner

APPARATUS AND METHOD FOR CANCELING MULTI-USER INTERFERENCE IN WIRELESS COMMUNICATION SYSTEM

PRIORITY

This application claims priority under 35 U.S.C. §119(a) to a Korean Patent Application filed on Dec. 30, 2013 in the Korean Intellectual Property Office and assigned Serial No. 10-2013-0166753, the contents of which are incorporated herein by reference.

BACKGROUND OF THE INVENTION

1. Field of the Invention

The present invention relates generally to an apparatus and method for canceling multi-user interference in a wireless communication system.

2. Description of the Related Art

Performance and capacity of a wireless communication system is restricted by radio propagation channel characteristics, such as inter-cell or intra-cell channel interference, path loss, and multi-path fading. To compensate for the restriction of the performance and capacity, power control, channel coding, rake reception and diversity antenna technologies have been developed.

In a mobile communication system having a cell structure, multiple terminals that exist within a cell perform wireless communication with a Base Station (BS) that serves the cell, and thus the BS receives uplink signals from the multiple terminals. In this case, signals transmitted by a terminal may act as interference to signals transmitted by other terminals. Particularly, if the power of the signal transmitted by the terminal is greater than the power of the signals from the other terminals, the signal transmitted by the terminal causes much more interference to the signals transmitted by the other terminals.

Accordingly, there is a need in the art for a scheme for effectively canceling multi-user interference in wireless communication systems.

SUMMARY OF THE INVENTION

The present invention has been made to address the above problems and disadvantages occurring in the prior art, and to provide at least the advantages set forth below.

Accordingly, an aspect of the present invention is to provide an apparatus and method for canceling multi-user interference in a wireless communication system.

An aspect of the present invention is to provide an apparatus and method for canceling multi-user interference from an uplink channel signal in a wireless communication system.

An aspect of the present invention is to provide an apparatus and method for canceling multi-user interference in a time domain in a wireless communication system.

In accordance with an aspect of the present invention, a method for canceling multi-user interference (MUI) by a Base Station (BS) in a wireless communication system includes determining a number of tones to accumulate channel values among tones included in a resource area, based on a minimum delta cyclic shift (CS) that represents a minimum gap between CS values allocated to user equipments (UEs) and a number of UEs to be multiplexed, creating a matrix of amounts of change in phase for the tones to accumulate for the UEs to be multiplexed, and canceling MUI based on a signal matrix that represents signals output from a decorrelator for the tones to accumulate and the matrix of amounts of change in phase.

In accordance with another aspect of the present invention, a BS for canceling multi-user interference (MUI) in a wireless communication system includes a scheduling unit configured to determine a number of tones to accumulate channel values among tones included in a resource area, based on a minimum delta cyclic shift (CS) that represents a minimum gap between CS values allocated to user equipments (UEs) and a number of UEs to be multiplexed, and a MUI canceler configured to create a matrix of amounts of change in phase for the tones to accumulate for the UEs to be multiplexed, and cancel MUI based on a signal matrix that represents signals output from a decorrelator for the tones to accumulate and the matrix of amounts of change in phase.

BRIEF DESCRIPTION OF THE DRAWINGS

The above and other aspects, features and advantages of the present invention will be more apparent by describing in detail embodiments thereof with reference to the attached drawings in which.

Throughout the drawings, like reference numerals will be understood to refer to like parts, components, and structures.

DETAILED DESCRIPTION

Embodiments of the present invention will be described in detail with reference to the accompanying drawings. In the drawings, the same or similar elements are denoted by the same reference numerals even though they are depicted in different drawings. In the following description, a detailed description of known functions and configurations incorporated herein will be omitted for the sake of clarity and conciseness.

An electronic device according to embodiments of the present invention includes communication functionality.

For example, the electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical instrument, a camera, a wearable device such as a Head-Mounted Device (HMD), an electronic cloth, an electronic bracelet, an electronic necklace, an electronic appcessory, an electronic tattoo, and a smart watch.

In accordance with embodiments of the present invention, the electronic device may also be a smart home appliance with communication functionality. For example, the smart home appliance may be a television, a Digital Video Disc (DVD) player, an audio player, a refrigerator, an air conditioner, a vacuum cleaner, an oven, a microwave oven, a washer, a drier, an air purifier, a set-top box, a TV box (e.g., Samsung HomeSync™, Apple TV™, or Google TV™), a gaming console, an electronic dictionary, a camcorder, or an electronic photo frame.

In accordance with embodiments of the present invention, the electronic device may be a medical instrument (e.g., a Magnetic Resonance Angiography (MRA) device, a Magnetic Resonance Imaging (MRI) device, a Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, an electronic voyage device such as a voyage navigation device, a gyroscope, or a compass, an electronic aerospace device, a security device, or an industrial or consumer-based robot.

The electronic device according to embodiments of the present invention may also be furniture, a part of a building/structure, an electronic board, an electronic signature receiver device, a projector, any of measuring devices such as a water meter, an electricity meter, a gas meter, or a meter for electromagnetic radiation, each having communication functionality.

According to embodiments of the present invention, the electronic device may be, but is not limited to, a combination of the aforementioned devices.

According to embodiments of the present invention, a User Equipment (UE) may be the electronic device.

In a wireless communication system, such as a Long Term Evolution (LTE) communication system, the UE transmits a Reference Signal (RS) sequence for channel estimation. The RS sequence is used for the purpose of channel estimation in a Physical Uplink Shared Channel (PUSCH) and a Physical Uplink Control Channel (PUCCH), for example. In the following description, a channel estimation scheme in PUSCH will be taken as an example, but the channel estimation scheme may be applied equally to other types of channels.

The RS sequence used for channel estimation in PUSCH is given as in the following Equation (1).

$$r_{u,v}^{(\alpha)}(n) = e^{j\alpha n} \bar{r}_{u,v}(n), \; 0 \leq n < M_{sc}^{RS} \quad (1)$$

In Equation (1), $$\alpha = \frac{2\pi n_{cs}}{12}$$

represents a phase shift value allocated for each user at certain intervals to separate respective signals for multiple users in case that the multiple users are to be multiplexed, $n_{cs}$ represents a Cyclic Shift (CS) value allocated for each user, and n represents a sub-carrier (or tone) index. U and v represent indexes associated with generation of a base sequence, where u is set to one of 0 to 29 and v is set 0 or 1.

If a particular frequency resource operated in the same cell is allocated to the multiple UEs, $\bar{r}_{u,v}(n)$ may be equally set for each UE, and $n_{cs}$ may be differently set for each UE.

In this case, the property of the RS sequence is determined depending on the difference in $n_{cs}$ between UEs to which the RS sequence is allocated, and the difference in $n_{cs}$ is called a minimum delta CS. For example, If two users are to be multiplexed, setting the minimum delta CS to 6 is typically the most beneficial in terms of interference, as this leads to the highest difference in phase between the users, which facilitates cancellation of interference between the users.

Figure 1:
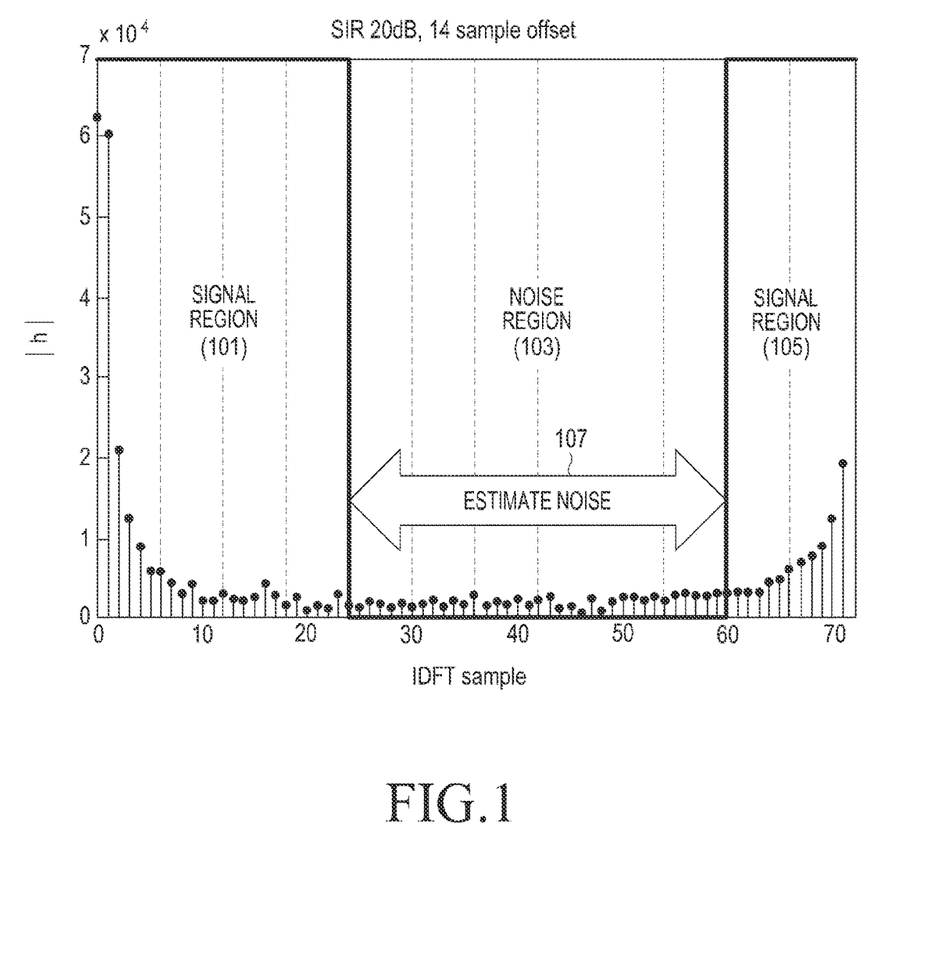
FIG. 1 is a graph illustrating Inverse Discrete Fourier Transform (IDFT) samples in the time domain, where an identical frequency resource is allocated for two users and a minimum delta CS is set to 6, to which the present invention is applied.

FIG. 1 is a graph illustrating Inverse Discrete Fourier Transform (IDFT) samples in the time domain, where an identical frequency resource is allocated to two users and a minimum delta CS is set to 6, to which the present invention is applied.

Referring to FIG. 1, assume a condition where Signal to Interference Ratio (SIR) is 20 dB and the sample offset is 14. This graph represents signal amplitudes of 72 IDFT samples, i.e., channel values |h|. The IDFT samples are obtained by applying IDFT to 72 tones that constitute 6 Resource Blocks (RBs) and converting the tones into time-domain components.

The time domain where the IDFT samples are distributed are divided into a signal region 101, a signal region 105, and a noise region 103 that is represented by an area centered at CS0 and the signal region 101, 105 represented by an area centered at CS6. Channel estimation is performed in the signal regions 101 and 105, and estimation for noise signals is performed in the noise region 103.

Figure 2A:
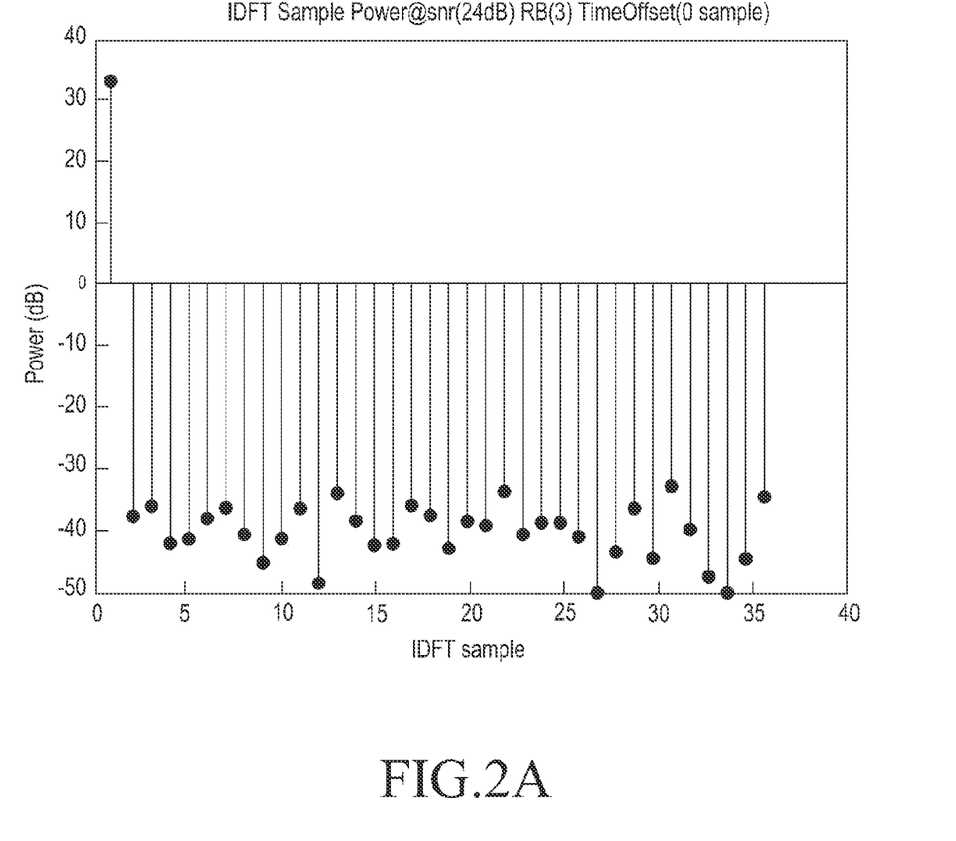
FIGS. 2A, 2B, and 2C are graphs illustrating signal power of IDFT samples based on time offset setting values, to which the present invention is applied.
Figure 2B:
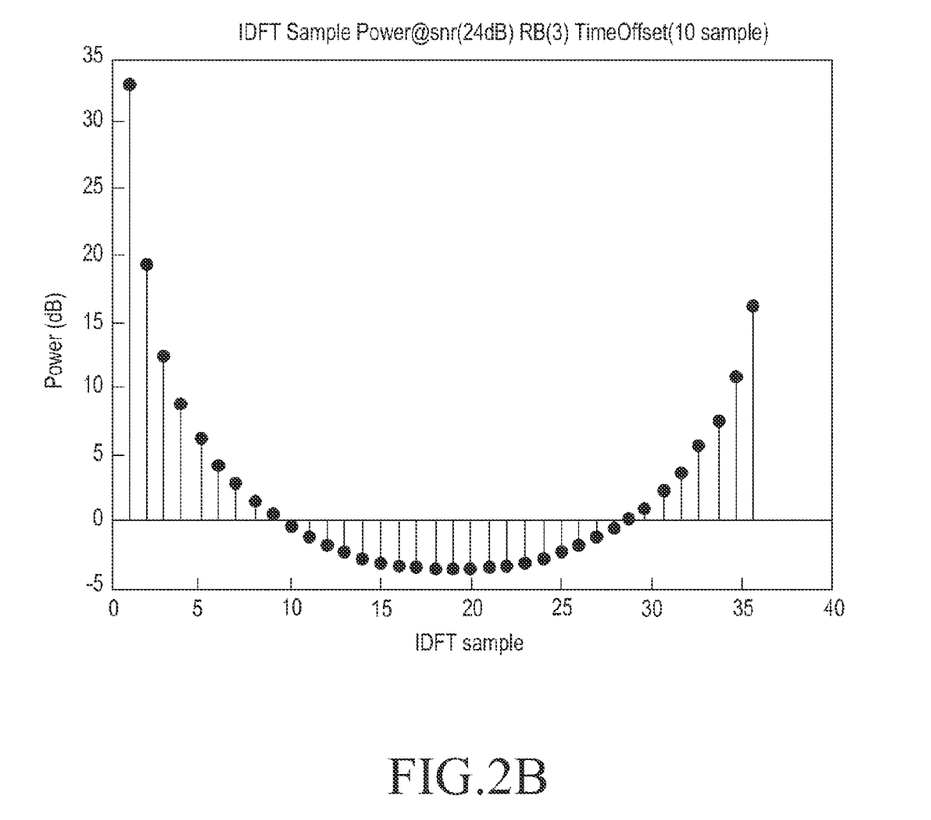
Figure 2C:
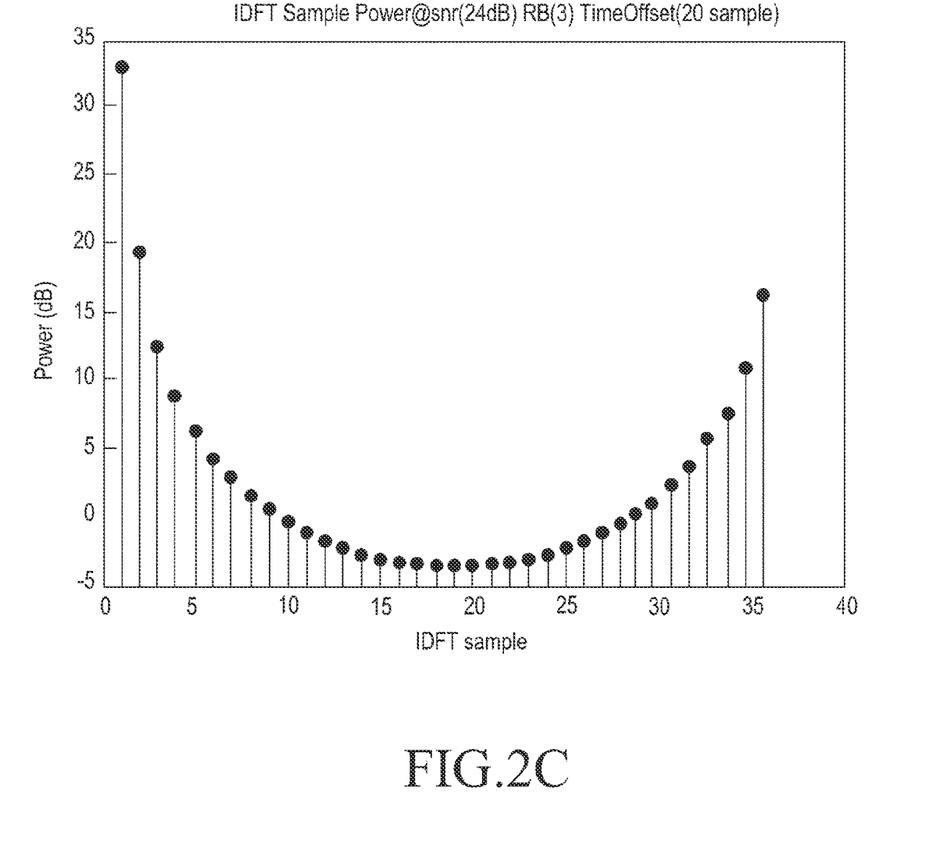

FIGS. 2A, 2B, and 2C are graphs illustrating the signal power of IDFT samples based on time offset setting values, to which the present invention is applied.

Referring to FIG. 2A, assume a condition where Signal to Noise Ratio (SNR) of an Additive White Gaussian Noise (AWGN) channel is 24 dB and time offset corresponds to 0 sample. The graph represents the signal power of IDFT samples obtained by applying IDFT to 36 tones that constitute 3 RBs.

In FIG. 2A, since the time offset setting value is 0, the signal power of IDFT sample 1 may be detected but the signal power of the other IDFT samples, IDFT samples 2 to 36 may not be detected. In other words, IDFT samples 2 to 36 have a signal power that is over about 70 dB below the signal power of IDFT sample 1.

Referring to FIG. 2B, a condition is assumed in which the SNR of the AWGN channel is 24 dB and the time offset corresponds to 10 samples. The graph represents the signal power of IDFT samples obtained by applying IDFT to 36 tones that constitute 3 RBs. An IDFT sample as used herein is a 2048 Fast Fourier Transform (FFT)-based sample, and the gap between adjacent samples is about 1.8489 us if about 325 ns of delay is applied. Therefore, even if there is about 325 ns of delay, the peak power of the IDFT sample 1 may be detected.

In FIG. 2B, since the time offset setting value is 10, the signal power of IDFT samples 1 to 9 and 29 to 36 may be detected but the signal power of the other IDFT samples, IDFT samples 10 to 28 may not be detected.

If the time offset setting value is 10, the signal power of the IDFT samples may be detected in a relatively wide area as compared with if the time offset setting value is 0. In this case, the signal power of the IDFT samples detected in the noise region may act as noise to the other UEs to which the same frequency resource is allocated.

Referring to FIG. 2C, a condition is assumed in which the SNR of the AWGN channel is 24 dB and the time offset corresponds to 20 samples. The graph represents the signal power of IDFT samples obtained by applying IDFT to 36 tones that constitute 3 RBs. An IDFT sample used herein is a 2048 FET-based sample, and the gap between adjacent samples is about 1.8489 us if about 325 ns of delay is applied. Therefore, even if there is about 325 ns of delay, the peak signal power of the IDFT sample 1 may be detected.

In FIG. 2C, since the time offset setting value is 20, signal power of all the IDFT samples 1 to 36 may be detected. If the time offset setting value is 20, the signal power corresponding to the IDFT samples may be detected in the entire time domain. In this case, signal power detected in the noise region acts as noise to the other UEs to which the same frequency resource is allocated.

As such, with multiple UEs to which the same frequency resource is allocated, time offset may be a factor to increase interference among the UEs.

A BS needs to consider characteristics in the phase changes for each tone depending on the time offset, to cancel the interference among the multiple UEs, i.e., MUI, and cancels the MUI by compensating for an amount of change in phase for a received signal. The amount of change in phase between tones is represented by a time offset function.

In other words, the BS estimates the time offset and reflects the estimation result on an algorithm for canceling the MUI, or an MUI cancellation algorithm.

The BS may also determine the number of tones to accumulate by considering the minimum delta CS that represents the minimum gap between CS values allocated for UEs and the maximum number of UEs to be multiplexed. For example, if the maximum number of UEs to be multiplexed in a PUSCH is twelve and the minimum delta CS value is six, the number of tones to accumulate is determined to be two. In this case, the BS cancels the MUI by compensating for an amount of change in phase for each of the two tones in the received signals in the two tones.

In another example, if the maximum number of UEs to be multiplexed is twelve and the minimum delta CS value is three, the number of tones to accumulate is determined to be four. In this case, the BS cancels the MUI by compensating for an amount of change in phase for each of the four tones in the received signals in the four tones.

Assuming that the maximum number of UEs to be multiplexed is represented by N_Max, the minimum delta CS by Min_Delta_CS, the number of tones to accumulate by Num_AvgTone, relations of N_Max, Min_Delta_CS 및 Num_AvgTone may be expressed as follows:

Case 1.

If the N_Max/Min_Delta_CS is an integer, Num_AvgTone may be calculated as follows:

Num_AvgTone=N_Max/Min_Delta_CS

Case 2.

If the N_Max/Min_Delta_CS is not an integer, Num_AvgTone may be defined as follows:

Num_AvgTone=12

In the following description, cases where the Min_Delta_CS is six and three, respectively, will be taken as examples, but the below principles may be applied to any case where the Min_Delta_CS is an integer equal to or less than twelve.

The following embodiment of the present invention considers if the Min_Delta_Cs is three and four UEs are to be multiplexed, for canceling MUI from a received signal in a BS.

The following Equation (2) represents channel values for consecutive four tones that correspond to signal components decorrelated in the frequency domain with respect to a first UE, UE0. It is assumed herein that the channel values for the UEs in the consecutive four tones are the same. For example, in Equation (2), $h_0$, $h_1$, $h_2$, $h_3$ represent channel values for the first tone between corresponding one of the first to fourth UEs and the BS, but may also be channel values for the second, third, or fourth tone.

Furthermore, Equation (2) represents a signal Y output from a decorrelator of the BS, and assuming that the signal Y does not contain noise and interference components but signal components, the signal Y may be modeled as follows:

$$Y_0 = h_0 + h_1 + h_2 + h_3 \tag{2}$$
$$Y_1 = h_0 e^{j\theta_0} + h_1 e^{j(\theta_1+\pi)} + h_2 e^{j(\theta_2+\frac{\pi}{2})} + h_3 e^{j(\theta_3-\frac{\pi}{2})}$$
$$Y_2 = h_0 e^{j2\theta_0} + h_1 e^{j2(\theta_1+\pi)} + h_2 e^{j2(\theta_2+\frac{\pi}{2})} + h_3 e^{j2(\theta_3-\frac{\pi}{2})}$$
$$Y_3 = h_0 e^{j3\theta_0} + h_1 e^{j3(\theta_1+\pi)} + h_2 e^{j3(\theta_2+\frac{\pi}{2})} + h_3 e^{j3(\theta_3-\frac{\pi}{2})}$$

where $Y_0$, $Y_1$, $Y_2$, $Y_3$ represent signals output from the decorrelator for respective tones, $h_0$, $h_1$, $h_2$, $h_3$ represent values of channels between the corresponding one of the first to fourth UEs, UE0, UE1, UE2, UE3, and the BS, and $\theta_0$, $\theta_1$, $\theta_2$, $\theta_3$ represent amounts of change in phase between tones according to time offsets of the UEs, UE0, UE1, UE2, UE3.

If the channel values of the four tones are accumulated and averaged without compensation for the amount of change in phase, the MUI may not be completely canceled and the residual term may remain.

Thus, a scheme for canceling MUI that considers the amount of change in phase between tones is required, and a channel value $h_0$ between the first UE and the BS according to the scheme may be represented by the following Equation (3). Specifically, the BS obtains weights considering the amounts of change in phase between tones according to a time offset for each UE, multiplies signals $Y_0$, $Y_1$, $Y_2$, $Y_3$ output from the decorrelator for the first to fourth tones by the respective weights, and then accumulates the weights.

$$h_0 = w_0 Y_0 + w_1 Y_1 + w_2 Y_2 + w_3 Y_3 \tag{3}$$

where $Y_0$, $Y_1$, $Y_2$, $Y_3$ represent signals output from the decorrelator for respective tones, $w_0$ represents a weight obtained by considering an amount of change in phase for the first tone, $w_1$ represents a weight obtained by considering an amount of change in phase for the second tone, $w_2$ represents a weight obtained by considering an amount of change in phase for the third tone, $w_3$ represents a weight obtained by considering an amount of change in phase for the fourth tone.

The weights multiplied by $Y_0$, $Y_1$, $Y_2$, $Y_3$, respectively may be represented by the following Equation (4):

$$w_0 = \frac{1}{(1+e^{j(\theta_0-\theta_1)}) \cdot (1+e^{j(\theta_0-\theta_2+\frac{\pi}{2})}) \cdot (1+e^{j(\theta_0-\theta_3-\frac{\pi}{2})})} \tag{4}$$
$$w_1 = w_0 \cdot (e^{-j\theta_1} + e^{-j(\theta_2-\frac{\pi}{2})} + e^{-j(\theta_3+\frac{\pi}{2})})$$
$$w_2 = w_0 \cdot (e^{-j(\theta_1+\theta_1-\frac{\pi}{2})} + e^{-j(\theta_1+\theta_3-\frac{\pi}{2})} + e^{-j(\theta_3+\theta_3)})$$
$$w_3 = w_0 \cdot e^{-j(\theta_1+\theta_2+\theta_3)}$$

where $\theta_0$, $\theta_1$, $\theta_2$, $\theta_3$ represent amounts of change in phase between tones according to time offsets for UEs, UE0, UE1, UE2, UE3, respectively.

The following embodiment of the present invention considers if the Min_Delta_CS is six and two UEs are to be multiplexed, for canceling MUI from a received signal in the BS.

The following Equation (5) represents two consecutive tones that correspond to signal components decorrelated in the frequency domain with respect to the first UE, UE0. It is assumed herein that the channel values for the UEs in the consecutive two tones are the same. Specifically, in Equation (5), $h_0$, $h_1$ represent channel values for the first tone between corresponding ones of the first and second UEs and the BS, but may also be channel values for the second tone.

Furthermore, Equation (5) represents a signal Y output from the decorrelator of the BS, and assuming that signal Y does not contain noise and interference components but signal components, signal Y may be modeled in Equation (5) as follows:

$$Y_0 = h_0 e^{j\theta_0} + h_1 e^{j(\theta_1 + \pi)}$$

$$Y_1 = h_0 e^{j2\theta_a} + h_1 e^{j2(\theta_1 + \pi)} \quad (5)$$

where $Y_0$, $Y_1$ represent signals output from the decorrelator for the respective tones, $h_0$, $h_1$ represent values of channels between corresponding one of the first and second UEs and the BS, and $\theta_0$, $\theta_1$ represent amounts of change in phase between tones according to a time offset for each of the UEs, UE0, UE1.

The channel value $h_0$ between the first UE and the BS in accordance with the scheme for canceling MUI may be represented by the following Equation (6):

$$h_0 = w_0 Y_0 + w_1 Y_1 \quad (6)$$

where $Y_0$, $Y_1$ represent signals output from the decorrelator for the respective tones, $w_0$ represents a weight obtained by considering the amount of change in phase for the first tone, and $w_1$ represents a weight obtained by considering the amount of change in phase for the second tone.

The weights multiplied by $Y_0$, $Y_1$, respectively, may be represented by the following Equation (7):

$$w_0 = \frac{1}{e^{j\theta_0}(1 + e^{j2(\theta_0 - \theta_1)})} \quad (7)$$

$$w_1 = \frac{e^{-j2\theta_1}}{e^{j\theta_0}(1 + e^{j2(\theta_0 - \theta_1)})}$$

where $\theta_0$, $\theta_1$ represent amounts of change in phase between tones according to time offsets for UE0, UE1, respectively.

The following embodiment of the present invention considers if 12 UEs are to be multiplexed, for canceling MUI from a received signal in the BS.

With the twelve UEs to be multiplexed, signal Y output from the decorrelator may generally be modeled as shown in the following Equation (8):

$$Y_0 = h_{0,0} + h_{1,0} + h_{2,0} + h_{3,0} + h_{4,0} + \quad (8)$$
$$h_{5,0} + h_{6,0} + h_{7,0} + h_{8,0} + h_{9,0} + h_{10,0} + h_{11,0}$$
$$Y_1 = h_{0,1} e^{j\theta_0} + h_{1,1} e^{j\theta_1} + h_{2,1} e^{j\theta_2} + h_{3,1} e^{j\theta_3} +$$
$$h_{4,1} e^{j\theta_4} + \ldots + h_{11,1} e^{j\theta_{11}}$$
$$\ldots$$
$$Y_{11} = h_{0,11} e^{j11\theta_0} + h_{1,11} e^{j11\theta_1} + h_{2,11} e^{j11\theta_2} +$$
$$h_{3,11} e^{j11\theta_3} + h_{4,11} e^{j11\theta_4} + \ldots + h_{11,11} e^{j11\theta_{11}}$$

where i indicates a UE index, and j indicates a tone index. $h_{0,0}$, $h_{1,0}$, $h_{2,0}$, . . . $h_{10,0}$, $h_{11,0}$ represent channel values between corresponding one of the first to twelfth UEs, UE0 to UE11, and the BS for the first tone, $h_{0,11}$, $h_{1,11}$, $h_{2,11}$, . . . $h_{10,11}$, $h_{11,11}$ represent channel values between corresponding one of the first to twelfth UEs, UE0 to UE 11, and the BS for the twelfth tone, and $\theta_0$ to $\theta_{11}$ represent amounts of change in phase between tones according to time offsets for the UEs, UE0 to UE11, respectively.

The signal Y output from the decorrelator, represented by Equation (8), may be expressed in a matrix form in Equation (9), as follows:

$$\overline{Y} = P\overline{H}, \overline{H} = P^{-1}\overline{Y} \quad (9)$$

$$\overline{Y} = \begin{bmatrix} Y_0 \\ Y_1 \\ Y_2 \\ Y_3 \\ Y_4 \\ Y_5 \\ Y_6 \\ Y_7 \\ Y_8 \\ Y_9 \\ Y_{10} \\ Y_{11} \end{bmatrix}, \overline{H} = \begin{bmatrix} h_0 \\ h_1 \\ h_2 \\ h_3 \\ h_4 \\ h_5 \\ h_6 \\ h_7 \\ h_8 \\ h_9 \\ h_{10} \\ h_{11} \end{bmatrix}$$

-continued $$P = \begin{bmatrix} 1 & 1 & 1 & 1 & 1 & 1 & 1 & 1 & 1 & 1 & 1 & 1 \\ e^{j\theta_0} & e^{j\theta_1} & e^{j\theta_2} & e^{j\theta_3} & e^{j\theta_4} & e^{j\theta_5} & e^{j\theta_6} & e^{j\theta_7} & e^{j\theta_8} & e^{j\theta_9} & e^{j\theta_{10}} & e^{j\theta_{11}} \\ e^{j2\theta_0} & e^{j2\theta_1} & e^{j2\theta_2} & e^{j2\theta_3} & e^{j2\theta_4} & e^{j2\theta_5} & e^{j2\theta_6} & e^{j2\theta_7} & e^{j2\theta_8} & e^{j2\theta_9} & e^{j2\theta_{10}} & e^{j2\theta_{11}} \\ e^{j3\theta_0} & e^{j3\theta_1} & e^{j3\theta_2} & e^{j3\theta_3} & e^{j3\theta_4} & e^{j3\theta_5} & e^{j3\theta_6} & e^{j3\theta_7} & e^{j3\theta_8} & e^{j3\theta_9} & e^{j3\theta_{10}} & e^{j3\theta_{11}} \\ e^{j4\theta_0} & e^{j4\theta_1} & e^{j4\theta_2} & e^{j4\theta_3} & e^{j4\theta_4} & e^{j4\theta_5} & e^{j4\theta_6} & e^{j4\theta_7} & e^{j4\theta_8} & e^{j4\theta_9} & e^{j4\theta_{10}} & e^{j4\theta_{11}} \\ e^{j5\theta_0} & e^{j5\theta_1} & e^{j5\theta_2} & e^{j5\theta_3} & e^{j5\theta_4} & e^{j5\theta_5} & e^{j5\theta_6} & e^{j5\theta_7} & e^{j5\theta_8} & e^{j5\theta_9} & e^{j5\theta_{10}} & e^{j5\theta_{11}} \\ e^{j6\theta_0} & e^{j6\theta_1} & e^{j6\theta_2} & e^{j6\theta_3} & e^{j6\theta_4} & e^{j6\theta_5} & e^{j6\theta_6} & e^{j6\theta_7} & e^{j6\theta_8} & e^{j6\theta_9} & e^{j6\theta_{10}} & e^{j6\theta_{11}} \\ e^{j7\theta_0} & e^{j7\theta_1} & e^{j7\theta_2} & e^{j7\theta_3} & e^{j7\theta_4} & e^{j7\theta_5} & e^{j7\theta_6} & e^{j7\theta_7} & e^{j7\theta_8} & e^{j7\theta_9} & e^{j7\theta_{10}} & e^{j7\theta_{11}} \\ e^{j8\theta_0} & e^{j8\theta_1} & e^{j8\theta_2} & e^{j8\theta_3} & e^{j8\theta_4} & e^{j8\theta_5} & e^{j8\theta_6} & e^{j8\theta_7} & e^{j8\theta_8} & e^{j8\theta_9} & e^{j8\theta_{10}} & e^{j8\theta_{11}} \\ e^{j9\theta_0} & e^{j9\theta_1} & e^{j9\theta_2} & e^{j9\theta_3} & e^{j9\theta_4} & e^{j9\theta_5} & e^{j9\theta_6} & e^{j9\theta_7} & e^{j9\theta_8} & e^{j9\theta_9} & e^{j9\theta_{10}} & e^{j9\theta_{11}} \\ e^{j10\theta_0} & e^{j10\theta_1} & e^{j10\theta_2} & e^{j10\theta_3} & e^{j10\theta_4} & e^{j10\theta_5} & e^{j10\theta_6} & e^{j10\theta_7} & e^{j10\theta_8} & e^{j10\theta_9} & e^{j10\theta_{10}} & e^{j10\theta_{11}} \\ e^{j11\theta_0} & e^{j11\theta_1} & e^{j11\theta_2} & e^{j11\theta_3} & e^{j11\theta_4} & e^{j11\theta_5} & e^{j11\theta_6} & e^{j11\theta_7} & e^{j11\theta_8} & e^{j11\theta_9} & e^{j11\theta_{10}} & e^{j11\theta_{11}} \end{bmatrix}$$

(20)

where $\overline{Y}$ refers to a matrix of the signals output from the decorrelator for the twelve respective tones, $\overline{H}$ refers to a matrix of channel values ($h_0$ to $h_{11}$) between each 5 of the first to twelfth UEs, UE0 to UE11, and the BS, and P refers to a matrix of amounts of change in phase for the twelve tones that correspond to UE0 to UE11, respectively. Each column of matrix P corresponds to each of UE0 to UE11. For example, in matrix P, the first column represents amounts of change in phase for 12 tones for UE0 and the twelfth column represents amounts of change in phase for the 12 tones for UE11.

In general, matrix $\overline{Y}$ of the signals output from the decorrelator is determined depending on the number of accumulated tones. For example, if the number of the accumulated tones is N, matrix $\overline{Y}$ corresponds to an N×1 matrix, matrix $\overline{H}$ corresponds to an N×1 matrix, and matrix P corresponds to an N×N matrix. Specifically, if the number of the accumulated tones is four, matrix $\overline{Y}$ corresponds to a 4×1 matrix with elements $Y_0$, $Y_1$, $Y_2$, $Y_3$, matrix $\overline{H}$ corresponds to a 4×1 matrix with elements $h_0$, $h_1$, $h_2$, $h_3$, and matrix P corresponds to a 4×4 matrix.

In the aforementioned embodiments, the BS cancels MUI by compensating for the amount of change in phase in a received signal, considering the characteristics in the phase changes for each tone according to the time offset.

However, if the difference in signal power between UEs to be multiplexed is equal to or greater than a predetermined threshold, it is difficult to estimate an exact time offset for a UE having relatively low signal power as compared to the other UEs. In this case, the BS may further consider signal strengths, such as Signal-to-Noise Ratios (SNRs), for the UEs to be multiplexed, in order to estimate an exact time offset for the UE having relatively low signal power.

In other words, the BS cancels the MUI considering both the SNR and the time offset for each of the UEs to be multiplexed.

Figure 3:
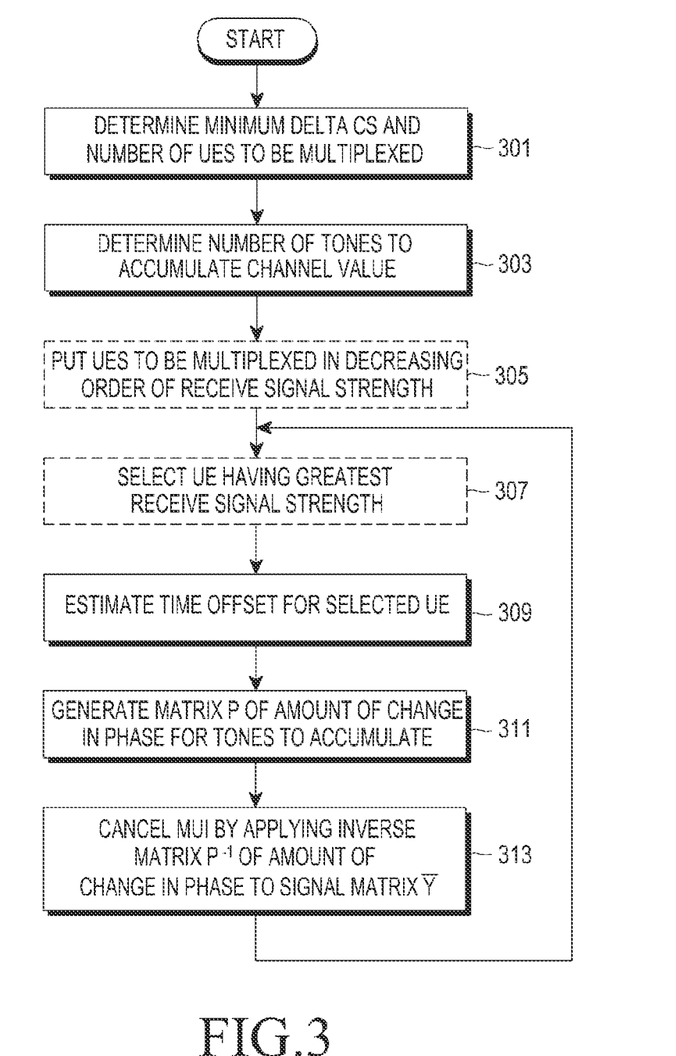
FIG. 3 is a flowchart illustrating a manner in which to cancel MUI from a received signal in a BS, according to an embodiment of the present invention.

FIG. 3 is a flowchart illustrating a manner in which to cancel MUI from a received signal in a BS, according to an embodiment of the present invention.

Referring to FIG. 3, in step 301, the BS determines the minimum delta CS that represents a minimum gap between CSs allocated to UEs and the number of UEs to be multiplexed. In step 303, the BS determines the number of tones to accumulate channel values among tones (or sub-carriers) that constitute a predetermined resource area, such as 1 RB, considering the minimum delta CS and the number of UEs to be multiplexed.

In step 305, the BS places UEs in decreasing order of their receive signal strengths, considering the strength (i.e., SNRs) of the respective signals received from the UEs to be multiplexed. In step 307, the BS selects a UE that has the highest receive signal strength based on the order.

The BS estimates a time offset for the selected UE in step 309, and creates a matrix P of amounts of change in phase for the tones to accumulate, considering the time offset in step 311. In step 313, the BS cancels the MUI by applying an inverse matrix $P^{-1}$ of matrix P to the signal matrix $\overline{Y}$ that represents signals output from the decorrelator for the tones to accumulate, and then returns to step 307.

In step 307, the BS selects a UE having the second highest receive signal strength based on the order, and performs steps 309 to 313. As such, in step 307, the BS sequentially selects UEs in the decreasing order of their receive signal strengths, and repeats steps 307 to 313 until all the UEs to be multiplexed are selected once.

In the embodiment of FIG. 3, if the difference in signal power between UEs to be multiplexed is equal to or greater than the predetermined threshold, MUI is canceled by further considering the signal strength for the UEs to be multiplexed to estimate an exact time offset for a UE having relatively low signal power.

However, if the difference in signal power between UEs to be multiplexed is not large enough, i.e., if the difference in signal power between the UEs is less than the predetermined threshold, matrix P of amounts of change in phase is created considering time offsets for the UEs to be multiplexed. In the latter case, steps 305 to 307 may be omitted. Specifically, after determining the number of tones to accumulate channel values in step 303, the BS estimates time offsets for the UEs to be multiplexed in step 309. In step 311, the BS creates matrix P of amounts of change in phase for the tones to accumulate, which correspond to the UEs to be multiplexed. The BS then cancels the MUI by applying an inverse matrix P−1 of matrix P to the signal matrix that represents signals output from the decorrelator for the tones to accumulate.

Figure 4A:
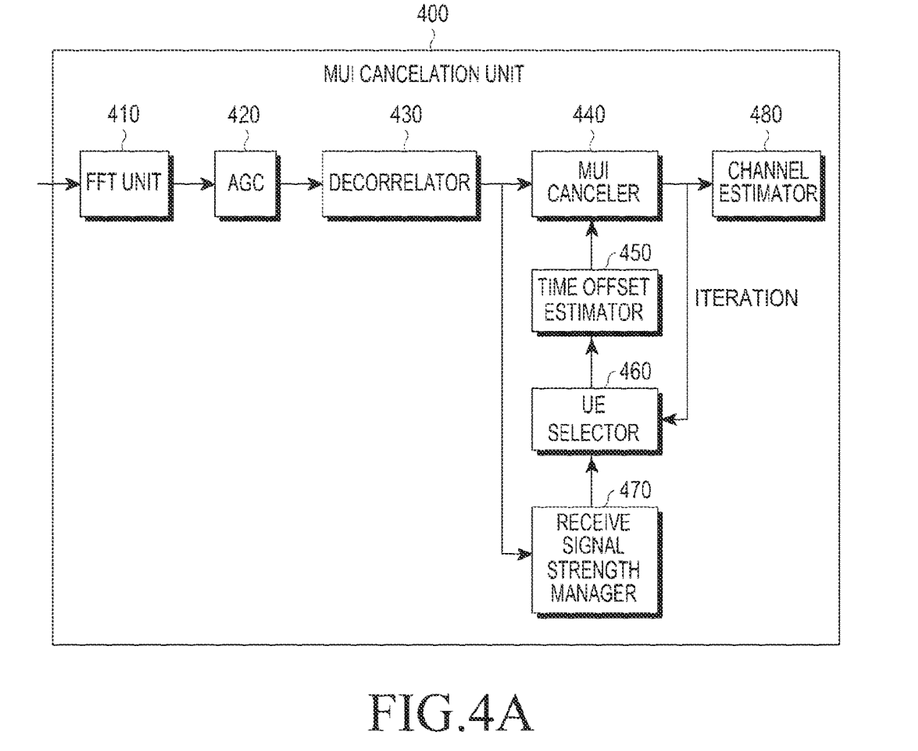
FIGS. 4A and 4B are block diagrams of an MUI cancellation unit in a BS for canceling MUI, according to an embodiment of the present invention.
Figure 4B:
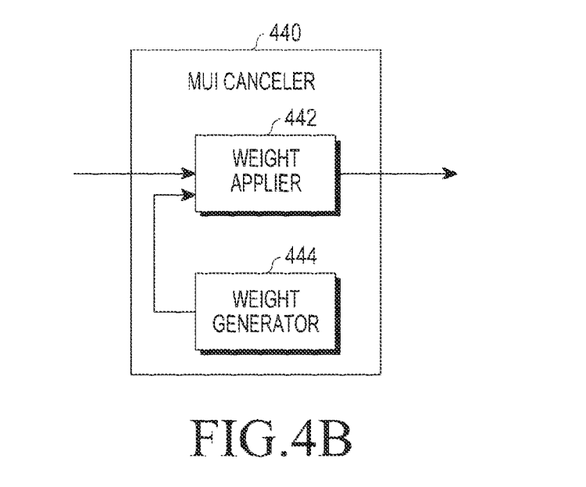

FIGS. 4A and 4B are block diagrams of an MUI cancellation unit in a BS for canceling MUI, according to an embodiment of the present invention.

Although not shown, the BS includes a transceiver and a controller, and the MUI cancellation unit may correspond to one of the units included in the controller. The controller may also include a scheduling unit for determining the minimum delta CS and the number of UEs to be multiplexed and determining the number of tones to accumulate channel values.

Referring to FIGS. 4A and 4B, the MUI cancellation unit 400 includes an FFT unit 410, an Automatic Gain Controller (AGC) 420, a decorrelator 430, an MUI canceler 440, a time offset estimator 450, a UE selector 460, a receive signal strength manager 470, and a channel estimator 480, and the MUI canceler 440 includes a weight applier 442 and a weight generator 444.

The transceiver of the BS receives a signal from UE and input the signal to the FFT unit 410, which in turn performs FFT on the input signal and outputs the result to the AGC 420. The AGC 420 adjusts the power of the input signal to which FFT was applied to a predetermined power and outputs the result to the decorrelator 430.

Upon reception of the output signal of the AGC 420, the decorrelator 430 performs decorrelation on the signal by multiplying the signal by an RS sequence and output the result to the MUI canceler 440 and the receive signal strength manager 470. The signal output by the decorrelator 430 may be represented by the aforementioned Equations (2), (5), and (8) depending on the number of tones to accumulate channels values determined by the scheduling unit included in the controller of the BS. Equation (2) represents what results from modeling of the signal output from the decorrelator based on channel values if the number of tones to accumulate is four, Equation (5) represents what results from modeling of the signal output from the decorrelator based on channel values if the number of tones to accumulate is two, and Equation (8) represents what results from modeling of the signal output from the decorrelator based on channel values if the number of tones to accumulate is twelve.

Although not shown, the receive signal strength manager 470 includes a measurement unit for measuring the receive signal strengths, and an ordering unit for placing the receive signal strengths in order. Upon reception of the output signal of the decorrelator 430, the receive signal strength manager 470 measures respective strengths, i.e., SNRs of signals received from the UEs to be multiplexed with the measurement unit. The receive signal strength manager 470 then places the UEs in decreasing order of their receive signal strengths with the ordering unit, and outputs the result to the UE selector 460. Information about the UEs to be multiplexed may be obtained from the scheduling unit included in the controller of the BS.

Upon reception of the output signal of the receive signal strength manager 470, the UE selector 460 selects a UE having the highest receive signal strength based on the order of receive signal strengths of the UEs, and outputs the result to the time offset estimator 450. The time offset estimator 450 then estimates a time offset for the selected UE, i.e., the UE having the highest receive signal strength, and outputs the estimation result to the MUI canceler 440.

The weight generator 444 of the MUI canceler 440 generates weights considering the amounts of change in phase of the tones to accumulate channel values. For example, the weight generator 444 generates the weight as expressed in Equation (4) if the number of tones to accumulate channel values is four, and the weight as expressed in Equation (7) if the number of tones to accumulate channel values is two. Furthermore, if the number of tones to accumulate channel values is twelve, matrix P of amounts of change in phase is created as expressed above in Equation (9).

The weight applier 442 of the MUI canceler 440 cancels the MUI by applying the weight generated by the weight generator 444 to the signal output from the decorrelator 430. Specifically, the weight generator 444 cancels the MUI as represented by Equation (3) if the number of tones to accumulate channel values is four, cancels the MUI as represented by Equation (6) if the number of tones to accumulate channel values is two, and cancels the MUI by applying inverse matrix $P^{-1}$ of the amounts of change in phase to the receive signal channel values as represented by Equation (9) if the number of tones to accumulate channel values is twelve.

As such, the MUI canceler 440 cancels the MUI with the weight applier 442 and output the MUI-canceled signal to the channel estimator 480. The channel estimator 480 estimates a channel between the UE and the BS based on the signal output from the MUI canceler 440.

In the above example, the UE selector 460 selects a UE having the highest receive signal strength, and the time offset estimator 450 estimates a time offset for the UE, outputs the result to the MUI canceler 440, and determines time offsets for the other UEs than the UE having the highest receive signal strength among UEs to be multiplexed to be zero and outputs the results to the MUI canceler 440. The UE selector 460 and the time offset estimator 450 may repeat their steps until the UE selector 460 selects all the UEs to be multiplexed once. That is, the UE selector 460 selects the UEs in decreasing order of their receive signal strengths.

For example, in the first iteration, the time offset estimator 450 estimates a time offset for the UE having the highest receive signal strength and outputs the result to the MUI canceler 440, determines time offsets for the other UEs than the UE having the highest receive signal strength among UEs to be multiplexed to be zero, and outputs the result to the MUI canceler 440.

In the second iteration, the time offset estimator 450 estimates a time offset for the UE having the two highest receive signal strengths, and outputs results of estimating time offsets for the two UEs having the two highest receive signal strengths, i.e., the UE having the highest receive signal strength and the UE having the second highest receive signal strength, to the MUI canceler 440. The time offset estimator 450 then determines time offsets for the other UEs than the two UEs having the two highest receive signal strengths to be zero and outputs the result to the MUI canceler 440.

In the third iteration, the time offset estimator 450 estimates a time offset for the UE having the three highest receive signal strengths, and outputs results of estimating time offsets for the three UEs having the three highest receive signal strengths, i.e., the UE having the highest receive signal strength, the UE having the second highest receive signal strength, and the UE having the third highest receive signal strength, to the MUI canceler 440. The time offset estimator 450 then determines time offsets for the other UEs than the three UEs having the three highest receive signal strengths to be zero and outputs the result to the MUI canceler 440.

Such iterations may be repeated until all the UEs to be multiplexed are selected once, i.e., as many as the number of UEs to be multiplexed.

According to the embodiments of the present invention, overall system performance is improved by effectively canceling multi-user interference in a wireless communication system.

It will be appreciated that the embodiments of the present invention may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The embodiments may be implemented by a computer or portable terminal including a controller and a memory, and the memory may be an example of the computer readable recording medium suitable for storing a program or programs having instructions that implement the embodiments of the present invention.

The present invention may be implemented by a program having codes for embodying the apparatus and method described in claims, the program being stored in a machine (or computer) readable storage medium. The program may be electronically carried on any medium, such as communication signals transferred via wired or wireless connection, and the present invention suitably includes its equivalent.

The apparatus for canceling MUI in accordance with the embodiments of the present invention receives and store the program from a program provider connected thereto via cable or wirelessly. The program provider includes a memory for storing programs having instructions to perform the embodiments of the present invention, information necessary for the embodiments of the present invention, etc., a communication unit for wired/wirelessly communicating with a mobile communication terminal, and a controller for sending the program to the mobile communication terminal 200 on request or automatically.

Although certain embodiments of the present invention have been described above, one of ordinary skill in the art will understand and appreciate that modifications can be made without departing the scope of the present invention. Thus, it will be apparent to those of ordinary skill in the art that the invention is not limited to the embodiments described, but can encompass not only the appended claims but their equivalents.

What is claimed is:

1. A method for canceling multi-user interference (MUI) by a base station (BS) in a wireless communication system, the method comprising:
   determining a number of sub-carriers to accumulate and average channel values among sub-carriers included in a resource area, based on a minimum delta cyclic shift (CS) that represents a minimum difference between CS values allocated to user equipments (UEs) and a number of UEs to which a same frequency resource is allocated within a cell;
   creating a matrix of amounts of change in phase in a time domain for the sub-carriers; and
   canceling MUI from signals received in the sub-carriers based on the matrix.

2. The method of claim 1, further comprising:
   estimating time offsets for the UEs to which the same frequency resource is allocated within the cell,
   wherein the matrix is created based on the estimated time offsets.

3. The method of claim 2, wherein estimating the time offsets comprises:
   measuring receive signal strengths for each of the UEs to which the same frequency resource is allocated within the cell;
   placing the UEs in decreasing order of the receive signal strengths based on a result of the measurements; and
   estimating time offsets for the UEs sequentially selected based on the decreasing order until all the UEs to which the same frequency resource is allocated within the cell are selected.

4. The method of claim 1, wherein canceling the MUI based on the matrix comprises:
   canceling the MUI by applying an inverse matrix of the matrix to a signal matrix of the received signals.

5. The method of claim 1, wherein the number of sub-carriers to accumulate and average the channel values is determined based on a maximum number (N_Max) of UEs to which the same frequency resource is allocated within a cell and the minimum delta CS (Min_Delta_CS).

6. The method of claim 5, wherein if N_Max/Min_Delta_CS is an integer, the number of sub-carriers to accumulate and average the channel values is determined to be the integer, and if N_Max/Min_Delta_CS is not an integer, the number of sub-carriers to accumulate and average the channel values is determined to be a predetermined integer.

7. The method of claim 1, wherein if the number of sub-carriers to accumulate and average the channel values is determined to be four, a channel value ($h_0$) between one of the UEs to which the same frequency resource is allocated within the cell and the BS is represented as follows:

$$h_0 = w_0 Y_0 + w_1 Y_1 + w_2 Y_2 + w_3 Y_3$$

where $Y_0$, $Y_1$, $Y_2$, $Y_3$ represent signals received in the sub-carriers, $w_0$ represents a weight obtained based on an amount of change in phase for a first sub-carrier among the sub-carriers to accumulate and average, $w_1$ represents a weight obtained based on an amount of change in phase for a second sub-carrier among the sub-carriers to accumulate and average, $w_2$ represents a weight obtained based on an amount of change in phase for a third sub-carrier among the sub-carriers to accumulate and average, and $w_3$ represents a weight obtained based on an amount of change in phase for a fourth sub-carrier among the sub-carriers to accumulate and average.

8. The method of claim 7, wherein the weights ($w_0$, $w_1$, $w_2$, $w_3$) are represented by the following:

$$w_0 = \frac{1}{(1 + e^{j(\theta_0 - \theta_1)}) \cdot (1 + e^{j(\theta_0 - \theta_2 + \frac{\pi}{2})}) \cdot (1 + e^{j(\theta_0 - \theta_3 - \frac{\pi}{2})})}$$

$$w_1 = w_0 \cdot (e^{-j\theta_1} + e^{-j(\theta_2 - \frac{\pi}{2})} + e^{-j(\theta_3 + \frac{\pi}{2})})$$

$$w_2 = w_0 \cdot (e^{-j(\theta_1 + \theta_2 - \frac{\pi}{2})} + e^{-j(\theta_1 + \theta_3 - \frac{\pi}{2})} + e^{-j(\theta_3 + \theta_3)})$$

$$w_3 = w_0 \cdot e^{-j(\theta_1 + \theta_2 + \theta_3)}$$

where $\theta_0$ represents an amount of change in phase between sub-carriers based on a time offset for a first UE among the UEs to which the same frequency resource is allocated within a cell, $\theta_1$ represents an amount of change in phase between sub-carriers based on a time offset for a second UE among the UEs to, which the same frequency resource is allocated within the cell, $\theta_2$ represents an amount of change in phase between sub-carriers based on a time offset for a third UE among the UEs to which the same frequency resource is allocated within the cell, and $\theta_3$ represents an amount of change in phase between sub-carriers based on a time offset for a fourth UE among the UEs to which the same frequency resource is allocated within the cell.

9. The method of claim 1, wherein if the number of sub-carriers to accumulate and average channel values is determined to be two, a channel value ($h_0$) between one of the UEs to which the same frequency resource is allocated within the cell and the BS is represented as follows:

$$h_0 = w_0 Y_0 + w_1 Y_1$$

where $Y_0$, $Y_1$ represent signals received in the sub-carriers, $w_0$ represents a weight obtained based on an amount of change in phase for a first sub-carrier among the sub-carriers to accumulate and average, and $w_1$ represents a weight obtained based on an amount of change in phase for a second sub-carrier among the sub-carriers to accumulate and average.

10. The method of claim 9, wherein the weights ($w_0$, $w_1$) are represented by the following:

$$w_0 = \frac{1}{e^{j\theta_0}(1 + e^{j2(\theta_0 - \theta_1)})}$$

$$w_1 = \frac{e^{-j2\theta_1}}{e^{j\theta_0}(1 + e^{j2(\theta_0 - \theta_1)})}$$

where $\theta_0$ represents an amount of change in phase between sub-carriers based on a time offset for a first UE among the UEs to which the same frequency resource is allocated within the cell, and $\theta_1$ represents an amount of change in phase between sub-carriers based on a time offset for a second UE among the UEs to which the same frequency resource is allocated within the cell.

11. A Base Station (BS) for canceling multi-user interference (MUI) in a wireless communication system, the BS comprising:
a scheduling unit configured to determine a number of sub-carriers to accumulate and average channel values among sub-carriers included in a resource area, based on a minimum delta cyclic shift (CS) that represents a minimum difference between CS values allocated to user equipments (UEs) and a number of UEs to which a same frequency resource is allocated within a cell; and
a MUI canceler configured to create a matrix of amounts of change in phase in a time domain for the sub-carriers, and cancel MUI from signals received in the sub-carriers based on the matrix.

12. The BS of claim 11, wherein the MUI canceler comprises a time offset estimator that estimates time offsets for the UEs to which the same frequency resource is allocated within the cell, and creates the matrix based on the estimated time offsets.

13. The BS of claim 12, wherein the time offset estimator is further configured to measure receive signal strengths for each of the UEs to which same frequency resource is allocated within the cell, place the UEs in decreasing order of the receive signal strengths based on a result of the measurements, and estimate time offsets for the UEs sequentially selected based on the decreasing order until all the UEs to which the same frequency resource is allocated within the cell are selected.

14. The BS of claim 11, wherein the MUI canceler is further configured to cancel the MUI by applying an inverse matrix of the matrix to a signal matrix of the received signals.

15. The BS of claim 11, wherein the number of sub-carriers to accumulate and average the channel values is determined based on a maximum number (N_Max) of UEs to which the same frequency resource is allocated within the cell and the minimum delta CS (Min_Delta_CS).

16. The BS of claim 15, wherein if N_Max/Min_Delta_CS is an integer, the number of sub-carriers to accumulate and average the channel values is determined to be the integer, and if N_Max/Min_Delta_CS is not an integer, the number of sub-carriers to accumulate and average the channel values is determined to be a predetermined integer.

17. The BS of claim 11, wherein if the number of sub-carriers to accumulate and average the channel values is determined to be four, a channel value ($h_0$) between one of the UEs to which the same frequency resource is allocated within the cell and the BS is represented as the following:

$$h_0 = w_0 Y_0 + w_1 Y_1 + w_2 Y_2 + w_3 Y_3$$

where $Y_0$, $Y_1$, $Y_2$, $Y_3$ represent signals received in the sub-carriers, $w_0$ represents a weight obtained based on an amount of change in phase for a first sub-carrier among the sub-carriers to accumulate and average, $w_1$ represents a weight obtained based on an amount of change in phase for a second sub-carrier among the sub-carriers to accumulate and average, $w_2$ represents a weight obtained based on an amount of change in phase for a third sub-carrier among the sub-carriers to accumulate and average, and $w_3$ represents a weight obtained based on an amount of change in phase for a fourth sub-carrier among the sub-carriers to accumulate and average.

18. The BS of claim 17, wherein the weights ($w_0$, $w_1$, $w_2$, $w_3$) are represented by the following:

$$w_0 = \frac{1}{(1 + e^{j(\theta_0 - \theta_1)}) \cdot (1 + e^{j(\theta_0 - \theta_2 + \frac{\pi}{2})}) \cdot (1 + e^{j(\theta_0 - \theta_3 - \frac{\pi}{2})})}$$

$$w_1 = w_0 \cdot \left( e^{-j\theta_1} + e^{-j(\theta_2 - \frac{\pi}{2})} + e^{-j(\theta_3 + \frac{\pi}{2})} \right)$$

$$w_2 = w_0 \cdot \left( e^{-j(\theta_1 + \theta_1 - \frac{\pi}{2})} + e^{-j(\theta_1 + \theta_3 - \frac{\pi}{2})} + e^{-j(\theta_3 + \theta_3)} \right)$$

$$w_3 = w_0 \cdot e^{-j(\theta_1 + \theta_2 + \theta_3)}$$

where $\theta_0$ represents an amount of change in phase between sub-carriers based on a time offset for a first UE among the UEs to which the same frequency resource is allocated within the cell, $\theta_1$ represents an amount of change in phase between sub-carriers based on a time offset for a second UE among the UEs to which the same frequency resource is allocated within the cell, $\theta_2$ represents an amount of change in phase between sub-carriers based on a time offset for a third UE among the UEs to which the same frequency resource is allocated within the cell, and $\theta_3$ represents an amount of change in phase between sub-carriers based on a time offset for a fourth UE among the UEs to which the same frequency resource is allocated within the cell.

19. The BS of claim 11, wherein if the number of sub-carriers to accumulate and average channel values is determined to be two, a channel value ($h_0$) between one of the UEs to which the same frequency resource is allocated within the cell and the BS is represented as the following:

$$h_0 = w_0 Y_0 + w_1 y_1$$

where $Y_0$, $Y_1$ represent signals received in the sub-carriers, $w_0$ represents a weight obtained based on an amount of change in phase for a first sub-carrier among the sub-carriers to accumulate and average, and $w_1$ represents a weight obtained based on an amount of change in phase for a second sub-carrier among the sub-carriers to accumulate and average.

20. The BS of claim 19, wherein the weights ($w_0$, $w_1$) are represented by the following:

$$w_0 = \frac{1}{e^{j\theta_0}(1 + e^{j2(\theta_0 - \theta_1)})}$$

$$w_1 = \frac{e^{-j2\theta_1}}{e^{j\theta_0}(1 + e^{j2(\theta_0 - \theta_1)})}$$

where $\theta_0$ represents an amount of change in phase between sub-carriers based on a time offset for a first UE among the UEs to which the same frequency resource is allocated within the cell, and $\theta_1$ represents an amount of change in phase between sub-carriers based on a time offset for a second UE among the UEs to which the same frequency resource is allocated within the cell.

\* \* \* \* \*